(12) United States Patent
Kithil (10) Patent No.: US 7,702,439 B2
(45) Date of Patent: Apr. 20, 2010

(54) CRASH SENSING VIA PIEZOELECTRIC SENSORS

(75) Inventor: Philip Kithil, Santa Fe, NM (US)

(73) Assignee: Methode Electronics, Inc., Chicago, IL (US)

( * ) Notice: Subject to any disclaimer, the term of this patent is extended or adjusted under 35 U.S.C. 154(b) by 918 days.

(21) Appl. No.: 10/562,442

(22) PCT Filed: Jun. 24, 2004

(86) PCT No.: PCT/US2004/019850

§ 371 (c)(1),
(2), (4) Date: Jun. 19, 2006

(87) PCT Pub. No.: WO2005/002919

PCT Pub. Date: Jan. 13, 2005

(65) Prior Publication Data

US 2006/0241834 A1    Oct. 26, 2006

Related U.S. Application Data

(60) Provisional application No. 60/482,695, filed on Jun. 25, 2003.

(51) Int. Cl.
*B60R 21/00* (2006.01)
(52) U.S. Cl. .................. 701/45; 180/271; 280/735
(58) Field of Classification Search ............ 701/45–47; 280/728.1, 734–735; 340/438
See application file for complete search history.

(56) References Cited

U.S. PATENT DOCUMENTS

| | | | |
|---|---|---|---|
| 4,346,914 A | 8/1982 | Livers et al. | |
| 4,842,301 A | 6/1989 | Feldmaier | |
| 5,814,897 A | 9/1998 | Ito et al. | |
| 6,823,244 B2 * | 11/2004 | Breed | 701/29 |
| 7,103,460 B1 * | 9/2006 | Breed | 701/29 |

FOREIGN PATENT DOCUMENTS

| | | |
|---|---|---|
| DE | 19745309 | 4/1999 |
| EP | 0 893 309 | 1/1999 |
| EP | 0893309 | 1/1999 |
| EP | 0 978 425 | 2/2000 |
| EP | 0978425 | 2/2000 |
| JP | 5-45567 | 6/1993 |
| JP | 10263989 | 6/1998 |
| JP | 2002-504223 | 2/2002 |

(Continued)

OTHER PUBLICATIONS

Supplemental European Search Report, Jul. 14, 2006.

*Primary Examiner*—Yonel Beaulieu
(74) *Attorney, Agent, or Firm*—Blank Rome LLP (57) ABSTRACT

A system and method for characterizing piezoelectric sensor responses for automotive vehicle crash analysis, is disclosed. The method employs Daubechies wavelet analysis (1006) to plot signal response amplitudes (1008) in three-dimensional space of at least one piezoelectric sensor. A cluster, signifying a combination of Daubechies amplitudes of the at least one piezoelectric sensor in three-dimensional space, is compared to reference clusters (1010) stored in the automotive vehicle. Based on results from comparing the cluster to the reference clusters, instructions are transmitted to an occupant restraint control system (1013) in the vehicle to deploy a specific airbag at a specific power level.

15 Claims, 6 Drawing Sheets

FOREIGN PATENT DOCUMENTS

| | | |
|---|---|---|
| JP | 2002-537568 | 11/2002 |
| JP | 03/062780 | 7/2003 |
| JP | 2005515466 | 5/2005 |
| WO | WO 97/16735 | 5/1997 |
| WO | WO-22/50261 | 8/2000 |
| WO | WO-03/062780 | 7/2003 |
| WO | WO-2005002919 | 1/2005 |

* cited by examiner

PVDF Axial Sensitivities

CRASH SENSING VIA PIEZOELECTRIC SENSORS

REFERENCE TO RELATED APPLICATIONS

This application claims priority to U.S. provisional application entitled, "Crash Sensing Via Piezoelectric Sensors", Ser. No. 60/482,695, filed Jun. 25, 2003.

FIELD OF THE INVENTION

The present invention is related to piezoelectric sensors and, more particularly, is related to a system and method for characterizing signals detected by multiple piezoelectric sensors applied to an automotive vehicle.

BACKGROUND OF THE INVENTION

Figure 1:
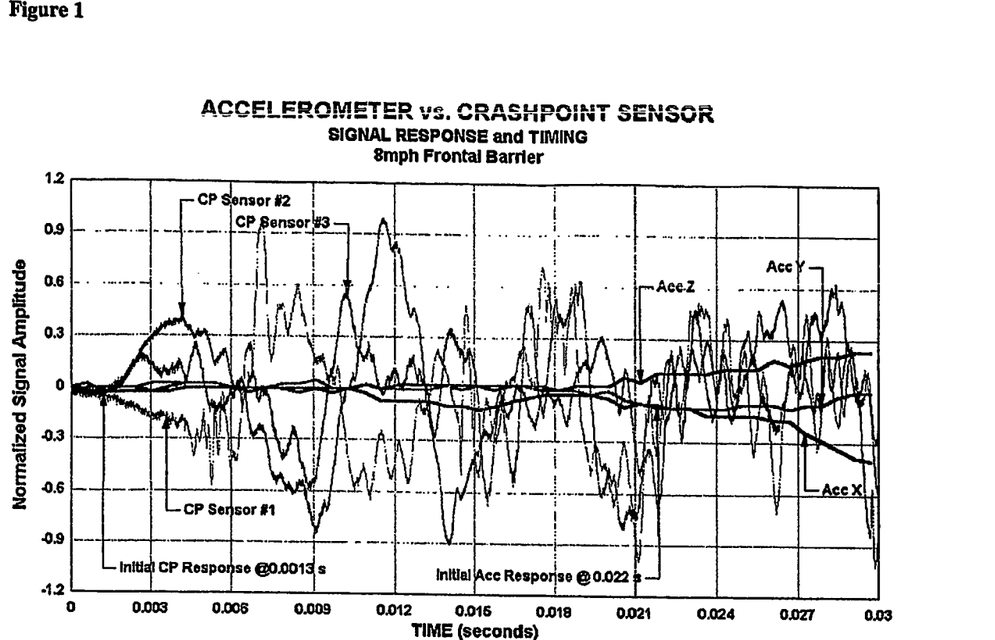
FIG. 1 is a drawing of a PVDF piezoelectric sensor response compared to a central accelerometer response (8 mph frontal barrier impact)

In a vehicle crash sensing and occupant protection system, multiple sensors may be used to determine the origin of the impact and other useful characteristics of the crash, to optimize the occupant restraining devices. As seen in FIG. 1, the stress waves from a vehicle impact propagate into the windshield glass in less than two milliseconds after impact, whereas the change in acceleration caused by the same impact is delayed by up to 20 milliseconds, as sensed by an accelerometer centrally located in the vehicle. The delayed response time of a central accelerometer is a severe constraint for inflatable occupant restraints (airbags), as the occupant may have moved into the deployment space leading to injuries from the rapidly expanding device. The delay is particularly serious for side impact sensing, due to the limited space between the occupant and the door impact point.

The delayed response time of accelerometers has led others to propose installing sensors close to the point of impact, namely in front of the engine or on the door, but with the adverse consequences of reduced reliability, greater expense, and unneeded system complexity. Sensors located close to the point of impact often are destroyed by the impact, thus cutting off critical information. Locating crash sensors close to the point of impact has the effect of subjecting the sensors to environmental extremes, leading to possible failure. Accelerometers subjected to extreme heat and cold may need to be recalibrated as they age, causing inconvenience and expense to the owner and producer. Furthermore, since the vehicle designer does not know in advance exactly where an impact might occur, many sensors are required to cover all the possible impact locations. This sensor proliferation leads to reduced system reliability and greater expense, due to additional wiring, connectors, and attachment of the sensors. Further constraints are caused by the axial sensitivity of accelerometers, which require precise alignment with the vehicle axes. There is a need to locate the accelerometers at specific points in the vehicle; otherwise the desired sensitivity is compromised.

It is known that most materials change shape or form when subjected to stress, and the change may be evidenced in the material by other mechanisms. One such mechanism is an acoustic wave in which acoustic energy propagates through the material without affecting the integrity. One way for measuring acoustic waves is by using piezoelectric sensors adhered to a surface of the vehicle.

Polyvinylidene fluoride piezoelectric sensors (PVDF) are uniquely suited for the measurement of induced stresses ranging from bars to hundreds of kilo-bars. The PVDF sensors are thin (less than 25 μm). unobtrusive, self-powered, adaptable to complex contours, and available in a variety of configurations. PVDF thin-film piezoelectric polymer transducers can be employed over a wide range of stresses. Because the speed of sound in solid materials is much greater than the speed of sound in air, the acoustic waves generated by a crash arrive at the edge of a vehicle's windshield in a few microseconds after impact. Hence, it is believed that the windshield of the vehicle would be a good place to locate the PVDF sensors to receive acoustic wave propagation after an impact. Although the bonding material which adheres the windshield to the vehicle acts to dampen the waves, the energy content is sufficient to cross this barrier and propagate into the glass. Thus, PVDF sensors readily detect the spike from a crash event.

It is believed that uniform and fast response times can be achieved by applying the high bandwidth piezoelectric sensing material, preferably polyvinylidene fluoride (PVDF), in sensors located on the windshield glass. Published PCT application entitled "Omni-Directional Crash Sensor", discloses a method for crash analysis employing geometric calculations based on inputs from multiple piezoelectric sensors applied to a vehicle transparency product such as the windshield. The piezoelectric material used in the sensor is polyvinylidene fluoride (PVDF). The PCT application also proposes methods of crash analysis employing signal spectrum analysis for at least two spectral frequencies. Reference is also made in this application to employing wavelets analysis for acoustic wave evaluation. The disclosure of this application is incorporated herein by reference.

Crash sensing algorithms for these distributed-sensor systems typically derive velocity or other measurements for each sensor and compare these to one or more thresholds. In some cases, the sensor response is decomposed into frequency bands with individual thresholds set for the centrally located accelerometer and the sensors on the periphery of the vehicle. These decision trees typically employ discrete analysis of inputs from the each of the sensors, and apply IF-AND-THEN logical operators to the separate data streams to arrive at a deploy decision. However, current technologies with airbag deployment in both the front and sides of the vehicle, in addition to two-stage airbag deployment, has rendered these algorithms too slow for adequate airbag deployment.

Because PVDF sensors possess very high bandwidth, they record vibrations or acoustic waves at frequencies not possible with accelerometers. That wide bandwidth contains information about many more modes of vibration that the windshield exhibits during crash and non-crash events. Those modes may be excited differently depending on the crash severity, direction, or other non-crash event, such as a rock hitting the windshield. Once the mode signals are separated, characteristics and differences between mode signals allows the determination of event conditions. Those techniques include time delay measurements, correlations, and interpeak delays. By subjecting the wave transmission received by the PVDF sensor to a wave analysis the modes of vibration may be separated according to transverse vs. longitudinal, rather than an arbitrary lower frequency threshold and arrival time of the acoustic wave. However, only a discrete analysis of each piezoelectric sensor input is possible because each sensor must be sampled and subjected to analysis on an individual basis. The aforementioned wavelet techniques do not involve successive analyses of a combination of sensory inputs to be obtained on a sample-by-sample basis, and using the result of the combination as the deciding factor in a crash analysis.

Thus, an unaddressed need exists in the industry to address the aforementioned deficiencies and inadequacies to analyze the input from multiple piezoelectric sensors which are located on the windshield of a vehicle.

SUMMARY OF THE INVENTION

Embodiments of the present invention provide a system and method for characterizing piezoelectric sensor signal responses.

The present invention also describes a form of piezoelectric sensor utilizing orthogonal single-axis PVDF sensing elements.

The present invention further describes a system architecture utilizing a dual signal path integrated circuit, with one path for fault diagnostics and a second path for crash pre-analysis. Also, a windshield application is disclosed in which the piezoelectric sensor is incorporated into the vehicle rearview mirror mounting button.

Briefly described, in architecture, a preferred embodiment of the invention employs wavelet analysis of three PVDF sensors located on the windshield. The outputs for all three PVDF sensors are combined in 3D feature space, providing a single characteristic for each input. Successive wavelet analyses of inputs in 3D feature space provides a clustering of input points over the selected time interval. The present invention accomplishes this by comparing the most recent scattering of signal amplitudes of PVDF sensors with various reference 3D clusters stored in a library to discriminate a match (a scattering that represents a crash event). Output may consist of one or more instructions to the vehicle's occupant restraint control system to deploy a specific airbag, what power level of airbag to deploy, and/or where applicable, to refrain from airbag deployment (bump in the road). The advantage of this wavelet method is found in assessing the combination of sensor inputs, sample-by-sample, rather than discrete analysis of one sensor input, then the next, then the next, etc.

Figure 2:
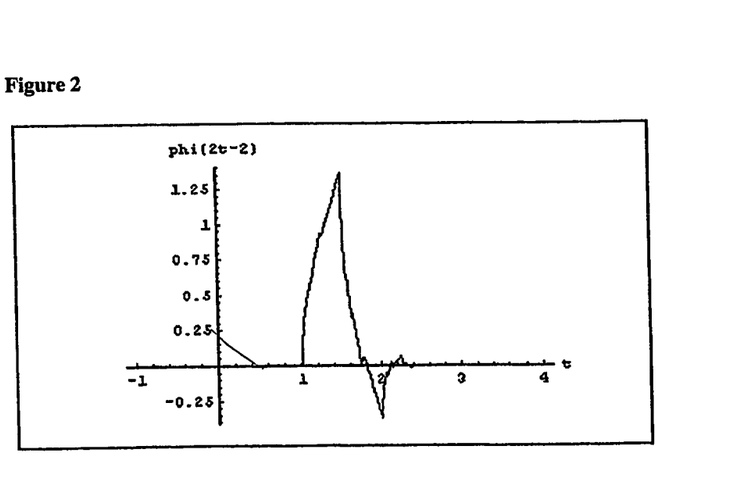
FIG. 2 is a drawing of a typical Daubechies transfer function.

This wavelet analysis method preferred employs a Daubechies transfer function. Daubechies transfer function for wavelet analysis is well known technology for acoustic wave analysis. (See, for example, Aboufadel, E., and Schlicker, S., Discovering Wavelets, 1999, Wiley; Aboufadel, E., and Schlicker, S., "Wavelets Introduction", Encyclopedia of Physical Science and Technology, $3^{rd}$ edition, Robert A. Meyers, editor, 2001, Academic Press; Daubechies, I., Ten Lectures on Wavelets, 1992, SIAM; "The World According to Wavelets: The Story of a Mathematical Technique", by Barbara Burke Hubbard, A K Peters Ltd., $2^{nd}$ edition, May 1998), the disclosures of which are hereby incorporated by reference. This function is a sample of a single response of the sensor. An illustrative Daubechies function is shown in FIG. 2.

Figure 3:
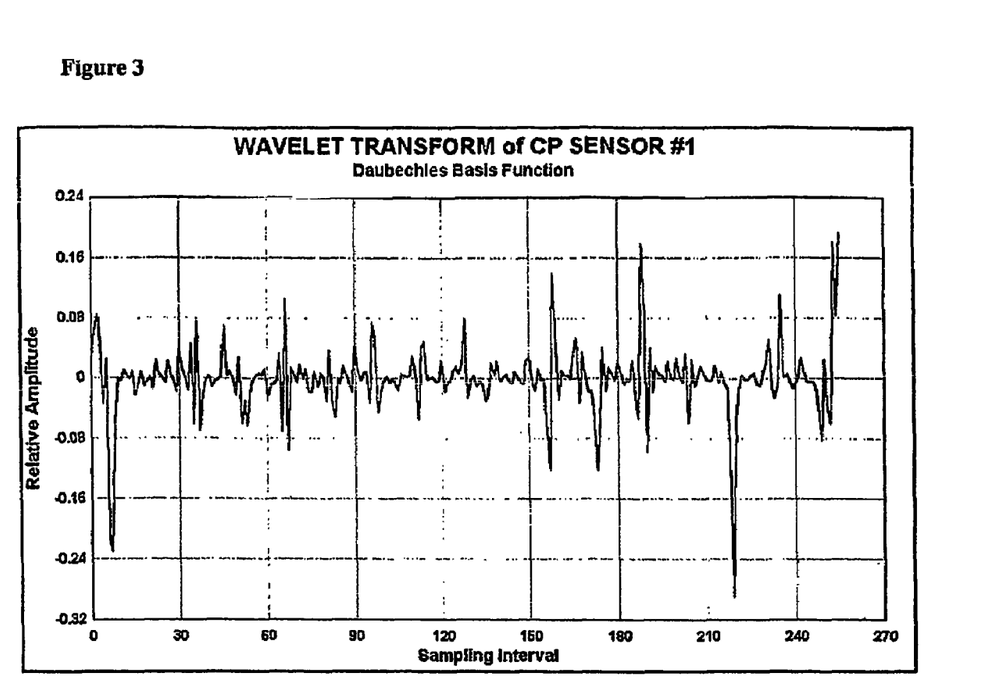
FIG. 3 is a drawing of a plot of 256 Daubechies Amplitudes for a PVDF windshield-mounted piezoelectric sensor.

Multiple Daubechies amplitudes for each of the sensors are plotted in three-dimensional space. This is seen in FIG. 3. The result is seen as a "cluster" of points, which uniquely characterize the event. In FIG. 3, the time period of ten milliseconds, and comprising 256 amplitudes, have been plotted in 3D space using the Daubechies amplitudes of three sensors.

The method continuously characterizes the most recent time period of data by comparing the most recent "cluster" to many referenced "clusters" which are determined experimentally. The referenced "clusters" will include many different crash events, such as frontal, side, rear, and rollover impacts; different crash velocities; different objects impacted such as solid barriers, other vehicles, pedestrians, animals, trees or poles, various engagement aspects and angles of the vehicle with the impacted object; objects impacting the vehicle such as side impacts by another vehicle; and a representative selection of other crash events which require supplemental occupant protection. The referenced "clusters" also include a variety of non-crash events such as rocks hitting the windshield, operation of windshield wipers, rain, hail, door, hood, and trunk slams, rough road vibrations, potholes, and the like.

Figure 4:
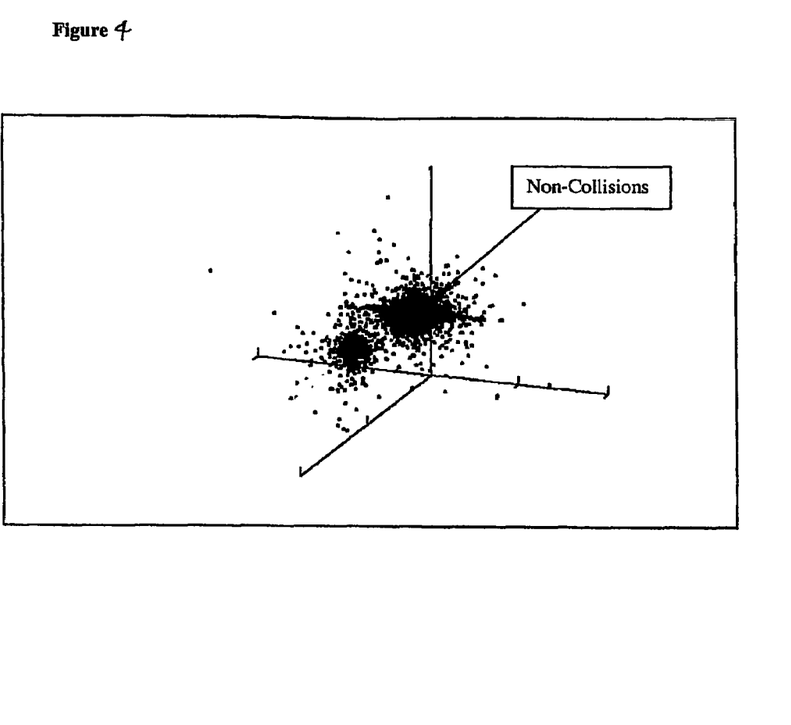
FIG. 4 is a drawing of 256 Daubechies Amplitudes for 3 PVDF windshield-mounted sensors (12 collisions) versus 259 non-collisions.

Similarly, in FIG. 4 is a comparison of 12 vehicle collisions (6 side impacts and 6 frontal impacts) versus 259 non-collisions.

The method is also applicable to assessing and modifying other vehicle conditions such as sound system volume and speaker balance, active suspension performance, activating wipers, detecting glass breakage, etc. Similarly, the method potentially can discriminate a vehicle impacting a pedestrian or cyclist versus the vehicle impacting another vehicle, a tree, or a barrier. In the case of a pedestrian or cyclist impact, the system could trigger countermeasures to reduce injury to that individual and not deploy the occupant restraints.

The method also could be used to apply cushioning to reduce the impact from a hard landing by an airborne object, helicopter, or plane.

The above functions and methods can be accomplished by an instruction set using a suitable microprocessor and memory located either within a single sensor, or located remotely such as within the vehicle safety system control unit, or distributed between the sensor and the control unit.

The instructions furthermore can be embedded in an application-specific integrated circuit (ASIC), as is well known in the art.

Figure 5:
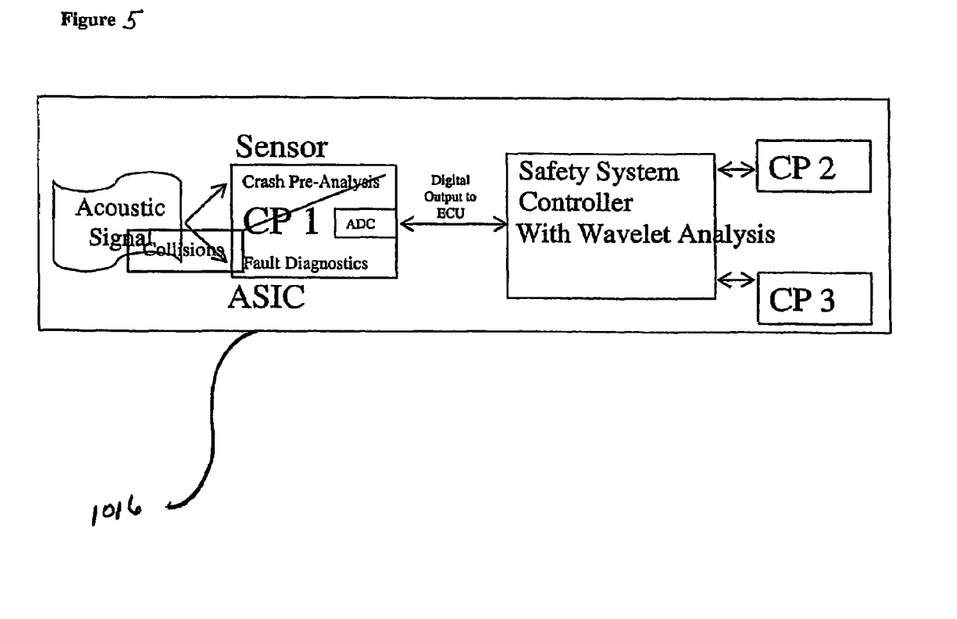
FIG. 5 is a block diagram of a piezoelectric sensor with a dual signal path.

The method furthermore can utilize sensor signals, which are pre-processed using several filtering and/or amplification modes. For example, one mode can pre-process the sensor signal to exclude low frequency components, which are typically associated with normal operating vehicle and engine vibrations, and include only higher frequency components typically associated with a vehicle impact event. A second fault diagnostic mode can pre-process the signal to accept the low frequency vibrational signals from normal vehicle operation, and reject the high frequency components. A block diagram for a PVDF sensor employing a dual signal path, one for high frequency crash signal analysis, and one for low frequency sensor diagnostics analysis, is seen in FIG. 5. In a vehicle crash sensing system employing PVDF sensors located on the windshield, the sensor electronics can include multiple signal filtering and amplification methods embedded in an ASIC located within the sensor housing, and the wavelet analysis event discrimination function can be embedded in an ASIC located within the safety system controller.

Figure 6:
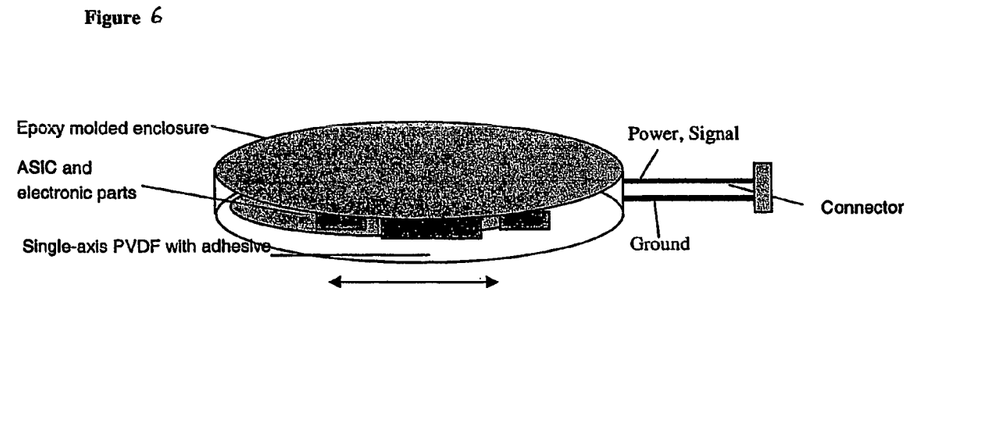
FIG. 6 is a drawing of a piezoelectric sensor using PVDF film sensitive to stress waves in a single axis.
Figure 7:
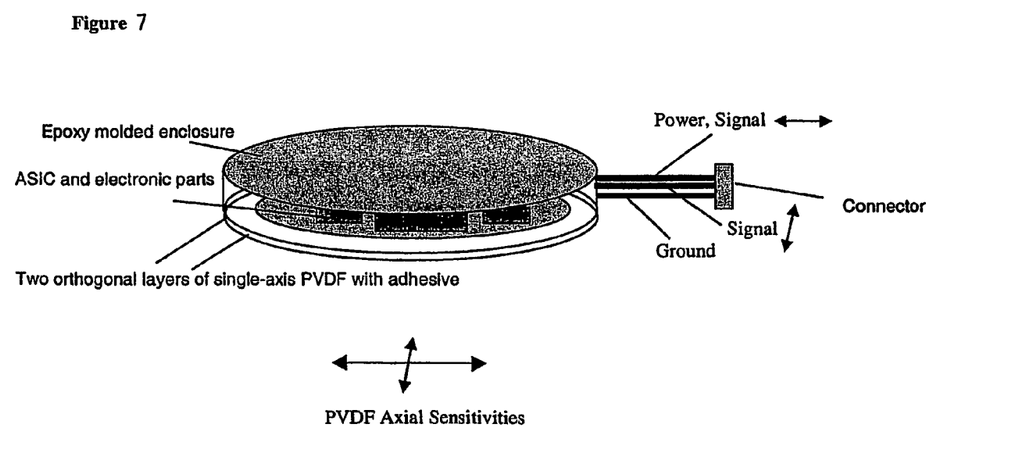
FIG. 7 is a drawing of a piezoelectric sensor with two co-located layers of the single-axis PVDF film, positioned orthogonally to provide directional sensitivity within the sensor.

Several forms of the PVDF sensor can be employed on the windshield. In one form, the PVDF film is bi-axial and therefore the signal output is virtually identical regardless of the directional orientation of the sensor. In a second form, seen in FIG. 6, the PVDF film is sensitive to stress waves in a single-axis and therefore the sensor is more sensitive to stress waves propagating from one direction than from an orthogonal direction. A third form of the sensor, seen in FIG. 7, employs two layers of the single-axis PVDF film, co-located either adjacent or stacked, with one PVDF layer oriented orthogonal to the other. This form provides directional sensitivity within a single sensor.

Figure 8:
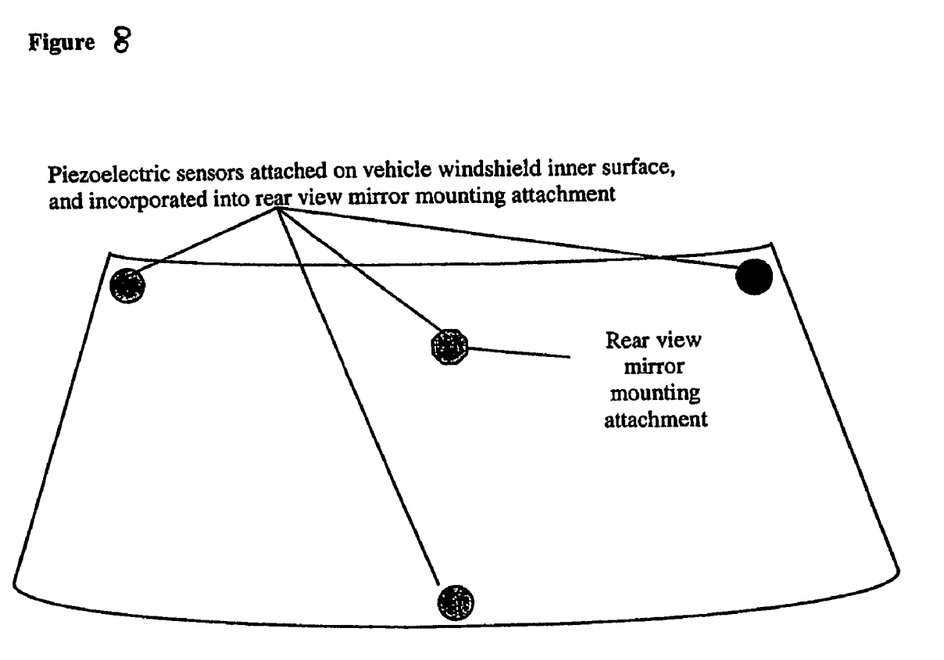
FIG. 8 is a drawing of a vehicle windshield with piezoelectric sensors located on the periphery and within the rear-view mirror button.

Any combination of these sensor forms can be mounted along the periphery of the vehicle windshield or conveniently located within the rear-view mirror attachment button, as depicted in FIG. 8.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 9:
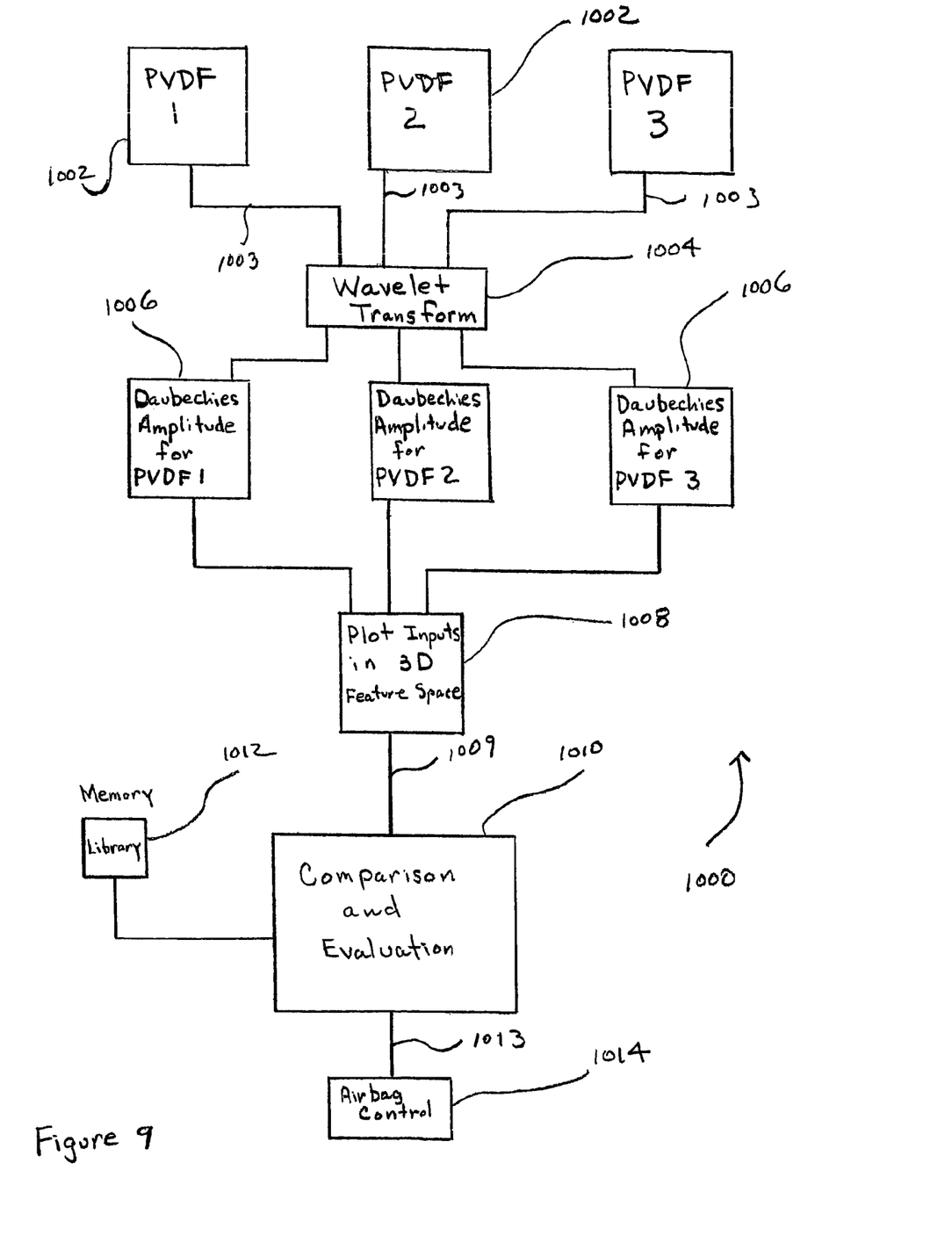
FIG. 9 is a flow diagram of a preferred embodiment of the invention.

FIG. 9 depicts a flow diagram of a preferred embodiment of the present invention.

The method 1000 includes providing three PVDF piezoelectric sensors 1002 mounted on the inside surface of a vehicle windshield (see FIG. 9). A sample of a single response 1003 over a predetermined period of time from each piezoelectric sensor 1002 is obtained. An application-specific integrated circuit (not shown) may be utilized to control sampling of the piezoelectric sensors 1002.

The responses 1003 from the three piezoelectric sensors 1002 are subjected to wavelet analysis via a Daubechies wavelet analysis 1004. The Daubechies wavelet analysis 1004 employs a Daubechies transfer function that performs signal conditioning on the single responses 1003 to produce Daubechies amplitudes 1006 for each piezoelectric sensor 1002.

The Daubechies amplitudes 1006 are aggregated and the intersection (commonality point) 1109 of the aggregated Daubechies amplitudes 1006 is plotted 1008 in three-dimensional space. Multiple Daubechies amplitudes 1006 are accumulated for a predetermined period of time to form a cluster 1009 of the Daubechies amplitudes 1006 of the three piezoelectric sensors 1002.

Clusters 1009 from a most recent sampling are compared to a library 1012 of reference clusters that are stored in a memory storage area of the vehicle. The reference clusters include many different crash events, such as frontal, side, rear, and rollover impacts, different crash velocities, etc as well as numerous non-crash events. The number of reference clusters is limited only by the number of scenarios that require deployment of airbags. Continuous sampling and comparisons of the most recent sampling provides the latest up-to-date status of crash integrity of the vehicle.

Using results from comparing the clusters 1009 to the reference clusters stored in the library 1012 an instruction 1013 is transmitted to an occupant restraint control system (airbag control) 1014 to deploy a specific airbag. Because the method 1000 uses a Daubechies wavelet analysis for a combination of sensor inputs, sample-by-sample, it is possible to activate a specific airbag at a specific power level. Where applicable, the instruction 1013 may be to not deploy the airbag because the vibration is nothing more than normal vehicle activity.

As stated above, because PVDF sensors detect in higher frequency components, lower frequency components that are normally associated with normal operating vehicle and engine vibrations may be excluded. An application-specific-integrated circuit (ASCII) 1016 (FIG. 6) with a dual signal path, one for high frequency crash signal analysis, and one for low frequency sensor diagnostics analysis can be used.

An ASCII located in one of the PVDF piezoelectric sensors 1002 may be used to control the method 1000.

In another embodiment, one of the piezoelectric sensors may be mounted into a rear-view mirror mounting button (not shown) of the vehicle.

In another embodiment, orthogonal single-axis PVDF piezoelectric sensors may be used for stress waves propagating from one direction.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for characterizing piezoelectric sensor signal responses for automotive vehicle crash analysis, said method comprising:
    providing at least one piezoelectric sensor mounted at a predetermined locations on the automotive vehicle;
    sampling a response from the piezoelectric sensor for a predetermined period of time;
    subjecting the response from the piezoelectric sensor to a wavelet analysis and obtaining signal amplitudes;
    plotting the signal amplitudes in three-dimensional space and forming a cluster of signal amplitudes;
    comparing a most recent cluster to reference clusters that are indicative of both crash and non-crash events; and
    providing instructions to an occupant restraint control system in the automotive vehicle.

2. The method of claim 1, further comprising providing three polyvinylidene fluoride piezoelectric sensors mounted at predetermined locations on a transparency product of the automotive vehicle.

3. The method of claim 2, wherein the transparency product is a windshield.

4. The method of claim 3, comprising applying a Daubechies transfer function in the wavelet analysis.

5. A method for characterizing piezoelectric sensor signal responses for automobile crash analysis, said method comprising:
- providing at least three polyvinylidene fluoride piezoelectric sensors;
- mounting the three polyvinylidene fluoride piezoelectric sensors on a windshield of the automobile;
- sampling responses from the three polyvinylidene fluoride piezoelectric sensors to a Daubechies wavelet analysis and obtaining Daubechies amplitudes for each polyvinylidene fluoride piezoelectric sensor;
- aggregating the Daubechies amplitudes from the three polyvinylidene fluoride piezoelectric sensors and plotting the intersection of the Daubechies amplitudes and forming a cluster of the Daubechies amplitudes.

6. The method of claim 5, comprising providing a fourth polyvinylidene fluoride piezoelectric sensor.

7. The method of claim 5, comprising incorporating the fourth polyvinylidene fluoride piezoelectric sensor into a rear-view mirror mounting button of the automobile.

8. The method of claim 5, further comprising using orthogonal single-axis polyvinylidene fluoride piezoelectric sensors.

9. The method of claim 5, further comprising using a dual signal path integrated circuit for sampling responses from the polyvinylidene fluoride piezoelectric sensors.

10. The method of claim 5, wherein at least one application-specific integrated circuit controls the method.

11. The method of claim 10, further comprising locating the at least one application-specific integrated circuit in at least one piezoelectric sensor.

12. The method of claim 10, further comprising locating the at least one application-specific integrated circuit within the occupant restraint control system.

13. The method of claim 1, further comprising:
- combining the signal amplitudes and plotting a commonality point of the signal amplitudes in three-dimensional space;
- comparing commonality points of most recent signal amplitudes to a library including a memory of reference commonality points of signal amplitudes; and
- instructing deployment of at least one airbag using results from comparing the most recent commonality points of signal amplitudes to the reference commonality points of signal amplitudes.

14. A method for characterizing a response from a sensor used for automotive vehicle crash analysis, said method comprising:
- providing at least one sensor mounted at a predetermined location on the automotive vehicle;
- sampling a response from the sensor for a predetermined period of time;
- subjecting the response from the sensor to a wavelet analysis and obtaining signal amplitudes;
- plotting the signal amplitudes in three-dimensional space and forming a cluster of signal amplitudes;
- comparing a most recent cluster to reference clusters that are indicative of both crash and non-crash events; and
- providing instructions to an occupant restraint control system in the automotive vehicle.

15. The method of claim 14, wherein the sensor is a piezoelectric sensor.

* * * * *